(12) United States Patent
Zhang

(10) Patent No.: US 11,663,795 B2
(45) Date of Patent: May 30, 2023

(54) STREAMING-BASED VR MULTI-SPLIT SYSTEM AND METHOD

(71) Applicant: QINGDAO PICO TECHNOLOGY CO., LTD., Shandong (CN)

(72) Inventor: Ruisheng Zhang, Shandong (CN)

(73) Assignee: QINGDAO PICO TECHNOLOGY CO., LTD., Qingdao (CN)

( * ) Notice: Subject to any disclaimer, the term of this patent is extended or adjusted under 35 U.S.C. 154(b) by 0 days.

(21) Appl. No.: 17/880,729

(22) Filed: Aug. 4, 2022

(65) Prior Publication Data

US 2022/0375180 A1 Nov. 24, 2022

Related U.S. Application Data

(63) Continuation of application No. PCT/CN2021/118541, filed on Sep. 15, 2021.

(30) Foreign Application Priority Data

Mar. 16, 2021 (CN) .......................... 202110280962.7

(51) Int. Cl.
*G06T 19/00* (2011.01)
(52) U.S. Cl.
CPC ................... *G06T 19/006* (2013.01)
(58) Field of Classification Search
None
See application file for complete search history.

(56) References Cited

U.S. PATENT DOCUMENTS

| | | | | |
|---|---|---|---|---|
| 10,965,929 | B1 * | 3/2021 | Bellows | H04N 13/122 |
| 2004/0064504 | A1 | 4/2004 | Domschitz | |
| 2013/0278631 | A1 * | 10/2013 | Border | G06Q 30/02 345/633 |
| 2016/0267806 | A1 * | 9/2016 | Hsu | G09B 19/00 |

(Continued)

FOREIGN PATENT DOCUMENTS

| | | |
|---|---|---|
| CN | 108520651 A | 9/2018 |
| CN | 109191964 A | 1/2019 |

(Continued)

OTHER PUBLICATIONS

International Search Report dated Dec. 15, 2021 in International Patent Application No. PCT/CN2021/118541.

*Primary Examiner* — David H Chu

(57) ABSTRACT

A streaming-based VR multi-split system and method are provided. The system includes a control system, a manipulation terminal and at least one experience terminal. The control system includes a streaming media server, a streaming coding and decoding interaction module and a VR platform. The streaming decoding and interaction processing module is configured to receive a video stream sent by the streaming coding and decoding interaction module, collect interaction data at one side of the manipulation terminal in real time, and transmit the interaction data to the streaming coding and decoding interaction module. The streaming coding and decoding interaction module sends a video picture code of the VR platform to the manipulation terminal, and pushes the video stream corresponding to the interaction data to the streaming media server. A presentation picture corresponding to an operation of the experience terminal is acquired by the streaming media server.

20 Claims, 2 Drawing Sheets

(56) References Cited

U.S. PATENT DOCUMENTS

| | | | | |
|---|---|---|---|---|
| 2017/0178408 | A1* | 6/2017 | Bavor, Jr. | G06T 19/006 |
| 2018/0001198 | A1* | 1/2018 | Frappiea | A63F 13/2145 |
| 2018/0077210 | A1* | 3/2018 | Hannuksela | H04L 65/60 |
| 2018/0315329 | A1* | 11/2018 | D'Amato et al. | G09B 5/02 |
| 2018/0352255 | A1* | 12/2018 | Hinds | H04N 19/115 |
| 2019/0243599 | A1* | 8/2019 | Rochford | G06F 3/147 |
| 2019/0304406 | A1* | 10/2019 | Griswold | G06T 19/00 |
| 2019/0377192 | A1* | 12/2019 | Ng-Thow-Hing | G09G 3/003 |
| 2021/0006752 | A1* | 1/2021 | Garcia Kilroy | G06V 20/40 |
| 2021/0097875 | A1* | 4/2021 | Alexander, IV | G06F 3/017 |
| 2022/0277524 | A1* | 9/2022 | Shtok | G09B 5/02 |

FOREIGN PATENT DOCUMENTS

| | | | |
|---|---|---|---|
| CN | 110246383 | A | 9/2019 |
| CN | 110503872 | A | 11/2019 |
| CN | 110519247 | A | 11/2019 |
| CN | 110533981 | A | 12/2019 |
| CN | 111179437 | A | 5/2020 |
| CN | 111341163 | A | 6/2020 |
| CN | 112309187 | A | 2/2021 |
| CN | 113141346 | A | 7/2021 |
| WO | 2021012054 | A1 | 1/2021 |

\* cited by examiner

STREAMING-BASED VR MULTI-SPLIT SYSTEM AND METHOD

CROSS-REFERENCE TO RELATED APPLICATION

The present disclosure is a continuation of International Application No. PCT/CN2021/118541, filed Sep. 15, 2021, which claims priority to Chinese patent application No. CN202110280962.7, filed Mar. 16, 2021 and entitled "Streaming-based VR Multi-split System and Method", the disclosure of each of which is hereby incorporated by reference in their entirety.

TECHNICAL FIELD

The present disclosure relates to the technical field of Virtual Reality (VR), and in particular, to a streaming-based VR multi-split system and method.

BACKGROUND

With the progress of society and the continuous development of a VR technology, VR-related technologies emerge in all walks of life, such as VR education, VR training and VR medical care, which occupy a large proportion in the current application market.

However, in the practical application process, there are more and more needs for one person to operate and multiple people to watch, and the content types are various. For example, in an educational scenario, teachers are required to operate for multiple students to watch, etc. Since there is no VR multi-split platform method at present, developers or schools cannot be provided with a platform to develop rich and diverse multi-split implementable solutions, resulting in the problems of limited application of the VR technology and unsatisfied user experience.

SUMMARY

In view of the above problems, embodiments of the present disclosure provide a streaming-based VR multi-split system and method, so as to solve the problem that the existing VR technology cannot provide a developer with a multi-split implementable solution available for development, affecting user experience and self-development.

A streaming-based VR multi-split system is provided according to an embodiment of the present disclosure, and the system includes a control system and a manipulation terminal and at least one experience terminal respectively connected to the control system. The control system includes a streaming media server, a streaming coding and decoding interaction module connected to the streaming media server and a VR platform connected to the streaming coding and decoding interaction module. A streaming decoding and interaction processing module connected to the streaming coding and decoding interaction module is arranged in the manipulation terminal. The streaming decoding and interaction processing module is configured to receive a video stream sent by the streaming coding and decoding interaction module, collect interaction data at one side of the manipulation terminal in real time, and transmit the interaction data to the streaming coding and decoding interaction module. The streaming coding and decoding interaction module sends a video picture code of the VR platform to the manipulation terminal, and pushes the video stream corresponding to the interaction data to the streaming media server. A streaming media player in the experience terminal is connected to the streaming media server, and acquires a presentation picture corresponding to an operation of the experience terminal through the streaming media server.

In addition, in an exemplary embodiment, the streaming decoding and interaction processing module includes a streaming decoding module and an interaction processing module. The streaming coding and decoding interaction module includes a frame coding module connected to the streaming decoding module, a streaming media stream coding module connected to the frame coding module, and an interaction receiving module connected to the interaction processing module. The interaction receiving module is configured to receive and decode interaction data collected by the interaction processing module, and butt the decoded interaction data to the VR platform. The frame coding module is configured to acquire and code a video frame of the video picture from the VR platform, transmit the coded video frame to the streaming decoding module, and transmit the video frame to the streaming media stream coding module. The streaming media stream coding module is configured to perform streaming media coding on the video frame, acquire a corresponding video stream, and push the video stream to the streaming media server. The streaming decoding module is configured to decode and display the coded video frame. The interaction processing module is configured to collect the interaction data, code the interaction data, and send the interaction data to the interaction receiving module.

In addition, in an exemplary embodiment, the interaction data includes head 6Dof data, hand 6Dof data, eye tracking data, and handle key data.

In addition, in an exemplary embodiment, the streaming media server is built into the control system using an open source framework, and the control system and the streaming media server are located in the same local area network.

In addition, in an exemplary embodiment, the control system includes a PC, and the streaming media server includes a public network cloud, a third party cloud and a PC located in the same local area network as the PC.

In addition, in an exemplary embodiment, the manipulation terminal and the control system are linked by wire or wirelessly, and the manipulation terminal and the control system are located in the same local area network or wireless public network.

In addition, in an exemplary embodiment, the manipulation terminal and the experience terminal include a VR all-in-one machine, a PC or a Pad.

In addition, in an exemplary embodiment, the VR platform includes a SteamVR platform or a self-contained platform of the control system.

In addition, in an exemplary embodiment, the experience terminal acquires a presentation picture corresponding to the operation of the experience terminal based on an address link corresponding to the video stream in the streaming media server.

According to another aspect of an embodiment of the present disclosure, a streaming-based VR multi-split method for presenting a picture using the above streaming-based VR multi-split system is provided. The method includes the following steps. A video picture is acquired and coded from a VR platform through a streaming coding and decoding interaction module, and the coded video picture is sent to a manipulation terminal. The coded video picture is received, decoded and displayed based on a streaming decoding and interaction processing module of the manipulation terminal, interaction data at one side of the manipulation terminal is collected in real time, and the interaction data is transmitted to the streaming coding and decoding interaction module. An experience terminal acquires and experiences a presentation picture corresponding to the interaction data through the streaming media server connected to the streaming coding and decoding interaction module.

With the above streaming-based VR multi-split system and method, a video picture can be acquired and coded from a VR platform through a streaming coding and decoding interaction module, and the coded video picture is sent to a manipulation terminal. The coded video picture is received, decoded and displayed based on a streaming decoding and interaction processing module of the manipulation terminal, interaction data at one side of the manipulation terminal is collected in real time, and the interaction data is transmitted to the streaming coding and decoding interaction module. An experience terminal acquires and experiences a presentation picture corresponding to the interaction data through the streaming media server connected to the streaming coding and decoding interaction module. The platform-level function support of VR can be realized, the application range is wide, and the self-development and expansion of users are facilitated.

In order to achieve the above and related objectives, one or more aspects of the present disclosure include features that will be explained in detail later. The following description and drawings describe some exemplary aspects of the present disclosure in detail. However, the aspects only indicate some of various ways allowing usage of principles of the present disclosure. Besides, the present disclosure is intended to include all the aspects and equivalents thereof.

BRIEF DESCRIPTION OF THE DRAWINGS

Other objects and results of the present disclosure will become more apparent and appreciated by reference to the following description taken in conjunction with the accompanying drawings, and as the present disclosure becomes more fully understood. In the drawings.

The same reference numbers in all drawings indicate similar or corresponding features or functions.

DETAILED DESCRIPTION OF THE EMBODIMENTS

In the following description, for purposes of explanation, numerous specific details are set forth in order to provide a thorough understanding of one or more embodiments. It may be apparent, however, that these embodiments may be practiced without these specific details. In other examples, well-known structures and devices are shown in a block diagram form in order to facilitate describing one or more embodiments.

In order to describe the streaming-based VR multi-split system and method of the present disclosure in detail, specific embodiments of the present disclosure will be described in detail below with reference to the accompanying drawings.

Figure 1:
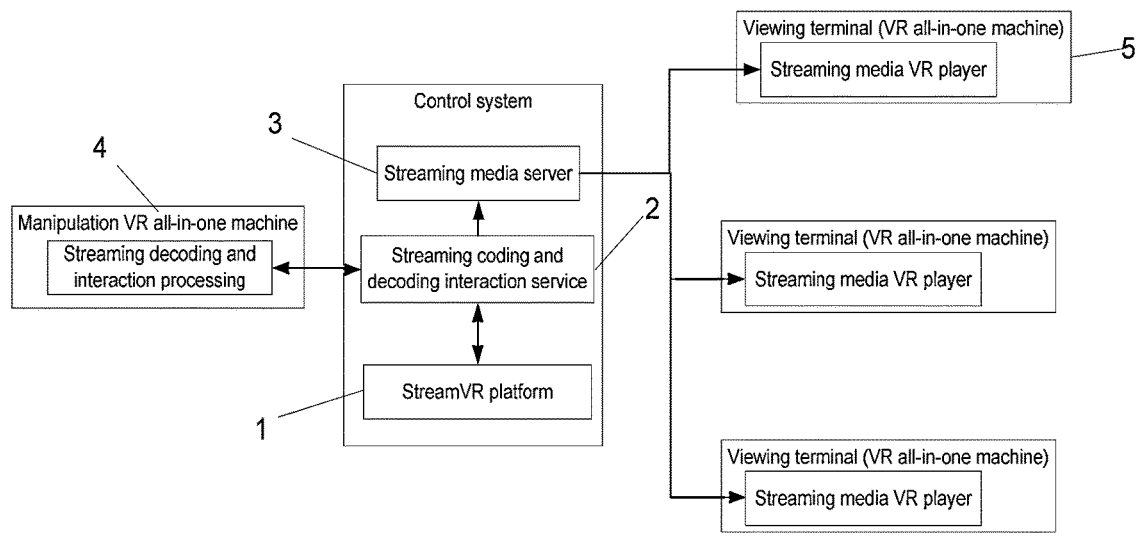
FIG. 1 is a logical block diagram of a streaming-based VR multi-split system according to an embodiment of the present disclosure.
Figure 2:
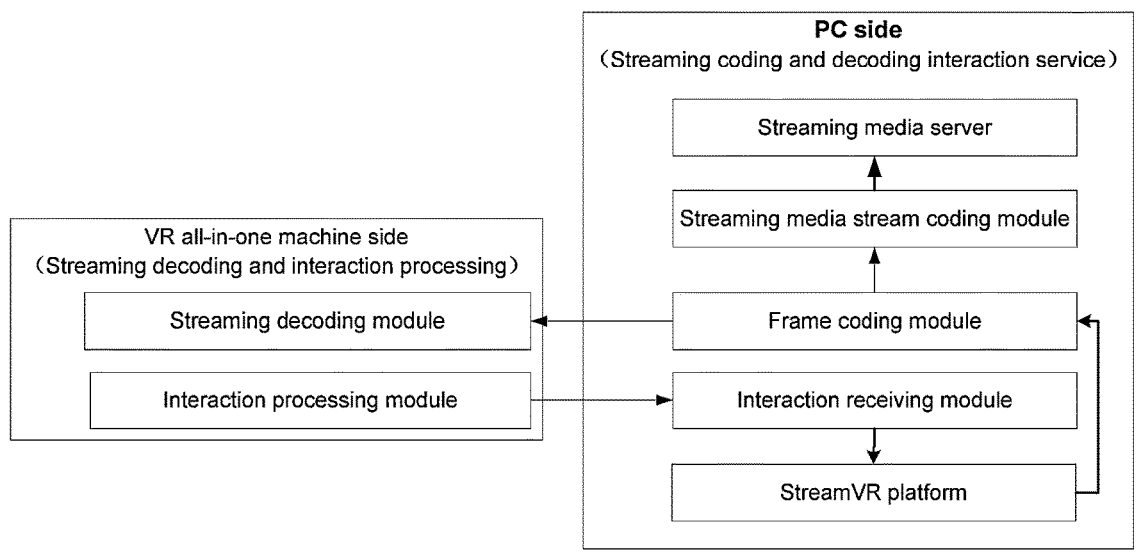
FIG. 2 is a logical block diagram of a manipulation terminal and a control system of a streaming-based VR multi-split system according to an embodiment of the present disclosure.

FIG. 1 and FIG. 2 show schematic logic of a streaming-based VR multi-split system, respectively, according to an embodiment of the present disclosure.

As shown in FIG. 1 and FIG. 2 together, a streaming-based VR multi-split system according to an embodiment of the present disclosure includes a control system and a manipulation terminal and at least one experience terminal respectively connected to the control system. The control system further includes a streaming media server, a streaming coding and decoding interaction module connected to the streaming media server and a VR platform connected to the streaming coding and decoding interaction module. A streaming decoding and interaction processing module connected to the streaming coding and decoding interaction module is arranged in the manipulation terminal. The manipulation terminal receives a video stream sent by the streaming coding and decoding interaction module through the streaming decoding and interaction processing module, collects interaction data at one side of the manipulation terminal in real time, and transmits the interaction data to the streaming coding and decoding interaction module. The streaming coding and decoding interaction module sends a video picture code of the VR platform to the manipulation terminal, and pushes the video stream corresponding to the interaction data to the streaming media server, so that multiple experience terminals respectively experience. A streaming media player in the experience terminal is connected to the streaming media server, and acquires a presentation picture corresponding to an operation of the experience terminal through the streaming media server, so as to finally achieve the effects of one manipulation terminal performing manipulation and multiple experience terminals performing a viewing experience.

Specifically, the streaming decoding and interaction processing module further includes a streaming decoding module and an interaction processing module. The streaming coding and decoding interaction module includes a frame coding module connected to the streaming decoding module, a streaming media stream coding module connected to the frame coding module, and an interaction receiving module connected to the interaction processing module. The interaction receiving module is configured to receive and decode interaction data collected by the interaction processing module, and butt the decoded interaction data to the VR platform. The frame coding module is configured to acquire and code a video frame of the video picture from the VR platform, transmit the coded video frame to the streaming decoding module, and transmit the video frame to the streaming media stream coding module. The streaming media stream coding module is configured to perform streaming media coding on the video frame, acquire a corresponding video stream, and push the video stream to the streaming media server for the viewing experience of the experience terminal.

The streaming decoding module is configured to decode and display the coded video frame for the manipulation terminal to perform real-time manipulation. The interaction processing module is configured to collect interaction data at the side of the manipulation terminal, code the interaction data, and send the interaction data to the interaction receiving module to complete streaming of the manipulation terminal. The streaming here mainly refers to the process of using handle and head interaction data (head hand 6Dof manipulation, keys, etc.) of a (manipulation terminal) VR all-in-one machine to manipulate games on a Steam platform, and then coding a game picture on a PC and transmitting the game picture back to the VR all-in-one machine.

The manipulation terminal and the experience terminal may include various forms of manipulation terminals such as a VR all-in-one machine, a PC or a Pad. When the manipulation terminal includes a head-mounted device, the corresponding interaction data thereof may include various forms and types of data such as head 6Dof data, hand 6Dof data, eye tracking data and handle key data. In addition, the control system includes a PC, and the streaming media server includes a public network cloud, a third party cloud and a PC located in the same local area network as the PC. The third party cloud may include an Ali cloud streaming media service or an AWS streaming media service, etc.

In the streaming-based VR multi-split system according to an embodiment of the present disclosure, the streaming media server may be built into the control system using an open source framework, and the control system and the streaming media server are located in the same local area network. For example, the streaming media server may be built on the PC where the VR platform is located using an open source framework, may also be built on the same local area network PC, or may use various forms such as a public network cloud and a third party cloud (Ali cloud streaming media service/AWS streaming media service).

In a specific implementation of the present disclosure, the VR platform may include a SteamVR platform or a self-contained platform of the control system, and a user or developer may develop service-related content based on the VR platform to implement a multi-split solution applicable to multiple scenarios. In the experience process of the experience terminal, a presentation picture corresponding to an operation of the experience terminal may be acquired based on an address link corresponding to the video stream in the streaming media server. For example, the experience terminal may open a streaming media address for real-time viewing through a streaming media VR player in the experience terminal, thereby achieving the effects of one operator and multiple viewers.

It should be noted that the VR all-in-one PC and the streaming PC may be linked by wire or wirelessly, and are located in the same local area network or in the future express wireless public network. The VR all-in-one machine receives a video stream transmitted by the PC machine, collects interaction data at the side of the VR all-in-one machine of the manipulation terminal in real time while playing, and transmits the interaction data to the PC to complete an interaction process of the game.

Figure 3:
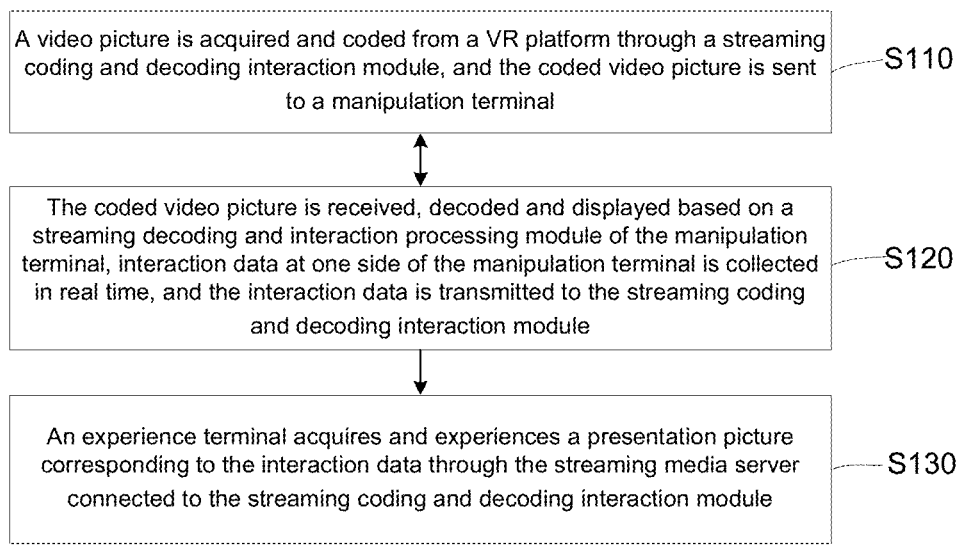
FIG. 3 is a flowchart of a streaming-based VR multi-split method according to an embodiment of the present disclosure.

The present disclosure also provides a streaming-based VR multi-split method corresponding to the above streaming-based VR multi-split system of the present disclosure. FIG. 3 shows a flow of a streaming-based VR multi-split method according to an embodiment of the present disclosure.

As shown in FIG. 3, a streaming-based VR multi-split method according to an embodiment of the present disclosure includes the following steps.

In S110, a video picture is acquired and coded from a VR platform through a streaming coding and decoding interaction module, and the coded video picture is sent to a manipulation terminal.

In S120, the coded video picture is received, decoded and displayed based on a streaming decoding and interaction processing module of the manipulation terminal, interaction data at one side of the manipulation terminal is collected in real time, and the interaction data is transmitted to the streaming coding and decoding interaction module.

In S130, an experience terminal acquires and experiences a presentation picture corresponding to the interaction data through the streaming media server connected to the streaming coding and decoding interaction module.

It should be noted that the above embodiment of the streaming-based VR multi-split method may be described with reference to the description in the embodiment of the streaming-based VR multi-split system, and will not be repeated herein.

According to the above streaming-based VR multi-split system and method of the present disclosure, on the one hand, a PC codes to a VR all-in-one machine at one side of a manipulation terminal and codes to a streaming media server at the same time. A viewing side of an experience terminal plays a live stream of streaming media through a VR player of the VR all-in-one machine so as to realize multi-split. By taking a streaming coding interaction (module) service as a core and cooperating with a SteamVR platform and a streaming media service, the effect of one-person operation and multi-person viewing is achieved. In addition, the streaming coding interaction (module) service butts with the SteamVR platform, developers can develop corresponding applications based on the VR platform, the application range is wide, and the service needs of multiple scenarios can be met.

An embodiment of the present disclosure also provides a computer-readable storage medium. The computer-readable storage medium stores a computer program. The computer program is configured to perform, when executed, the steps in any one of the above method embodiments.

An embodiment of the present disclosure also provides an electronic device, which includes a memory and a processor. The memory stores a computer program. The processor is configured to run the computer program to perform the steps in any one of the above method embodiments.

The streaming-based VR multi-split system and method according to embodiments of the present disclosure are described above by way of example with reference to the accompanying drawings. However, those skilled in the art should understand that various improvements can be made to the streaming-based VR multi-split system and method proposed in the present disclosure, without departing from the content of the present disclosure. Therefore, the scope of protection of the present disclosure should be determined by the content of the appended claims.

What is claimed is:

1. A streaming-based Virtual Reality (VR) multi-split system, comprising: a control system, a manipulation terminal and at least one experience terminal, the manipulation terminal and the at least one experience terminal are respectively connected to the control system, wherein
the control system comprises a streaming media server, a streaming coding and decoding interaction module connected to the streaming media server, and a VR platform connected to the streaming coding and decoding interaction module;
a streaming decoding and interaction processing module connected to the streaming coding and decoding interaction module is arranged in the manipulation terminal;
the streaming decoding and interaction processing module is configured to receive a video stream sent by the streaming coding and decoding interaction module, collect interaction data at one side of the manipulation terminal in real time, and transmit the interaction data to the streaming coding and decoding interaction module;

the streaming coding and decoding interaction module is configured to send a video picture code of the VR platform to the manipulation terminal, and push the video stream corresponding to the interaction data to the streaming media server; and a streaming media player in the experience terminal is configured to connect to the streaming media server, and acquire a presentation picture corresponding to an operation of the experience terminal through the streaming media server.

2. The streaming-based VR multi-split system according to claim 1, wherein the streaming decoding and interaction processing module comprises a streaming decoding module and an interaction processing module, the streaming coding and decoding interaction module comprises a frame coding module connected to the streaming decoding module, a streaming media stream coding module connected to the frame coding module, and an interaction receiving module connected to the interaction processing module;

the interaction receiving module is configured to receive and decode interaction data collected by the interaction processing module, and butt the decoded interaction data to the VR platform;

the frame coding module is configured to acquire and code a video frame of the video picture from the VR platform, transmit the coded video frame to the streaming decoding module, and transmit the video frame to the streaming media stream coding module;

the streaming media stream coding module is configured to perform streaming media coding on the video frame, acquire a corresponding video stream, and push the video stream to the streaming media server;

the streaming decoding module is configured to decode and display the coded video frame; and the interaction processing module is configured to collect the interaction data, code the interaction data, and send the interaction data to the interaction receiving module.

3. A streaming-based VR multi-split method for presenting a picture using the streaming-based VR multi-split method as claimed in claim 2, the method comprising:

acquiring and coding a video picture from a VR platform through a streaming coding and decoding interaction module, and sending the coded video picture to a manipulation terminal;

receiving, decoding and displaying the coded video picture based on a streaming decoding and interaction processing module of the manipulation terminal, collecting interaction data at one side of the manipulation terminal in real time, and transmitting the interaction data to the streaming coding and decoding interaction module; and acquiring and experiencing, by an experience terminal, a presentation picture corresponding to the interaction data through the streaming media server connected to the streaming coding and decoding interaction module.

4. The streaming-based VR multi-split system according to claim 1, wherein the interaction data comprises head (6 Degrees of Freedom) 6Dof data, hand 6Dof data, eye tracking data, and handle key data.

5. A streaming-based VR multi-split method for presenting a picture using the streaming-based VR multi-split method as claimed in claim 4, the method comprising:

acquiring and coding a video picture from a VR platform through a streaming coding and decoding interaction module, and sending the coded video picture to a manipulation terminal;

receiving, decoding and displaying the coded video picture based on a streaming decoding and interaction processing module of the manipulation terminal, collecting interaction data at one side of the manipulation terminal in real time, and transmitting the interaction data to the streaming coding and decoding interaction module; and acquiring and experiencing, by an experience terminal, a presentation picture corresponding to the interaction data through the streaming media server connected to the streaming coding and decoding interaction module.

6. The streaming-based VR multi-split system according to claim 1, wherein the streaming media server is built into the control system using an open source framework; and the control system and the streaming media server are located in the same local area network.

7. A streaming-based VR multi-split method for presenting a picture using the streaming-based VR multi-split method as claimed in claim 6, the method comprising:

acquiring and coding a video picture from a VR platform through a streaming coding and decoding interaction module, and sending the coded video picture to a manipulation terminal;

receiving, decoding and displaying the coded video picture based on a streaming decoding and interaction processing module of the manipulation terminal, collecting interaction data at one side of the manipulation terminal in real time, and transmitting the interaction data to the streaming coding and decoding interaction module; and acquiring and experiencing, by an experience terminal, a presentation picture corresponding to the interaction data through the streaming media server connected to the streaming coding and decoding interaction module.

8. The streaming-based VR multi-split system according to claim 1, wherein the control system comprises a PC; and the streaming media server comprises a public network cloud, a third party cloud and a PC located in the same local area network as the PC.

9. A streaming-based VR multi-split method for presenting a picture using the streaming-based VR multi-split method as claimed in claim 8, the method comprising:

acquiring and coding a video picture from a VR platform through a streaming coding and decoding interaction module, and sending the coded video picture to a manipulation terminal;

receiving, decoding and displaying the coded video picture based on a streaming decoding and interaction processing module of the manipulation terminal, collecting interaction data at one side of the manipulation terminal in real time, and transmitting the interaction data to the streaming coding and decoding interaction module; and acquiring and experiencing, by an experience terminal, a presentation picture corresponding to the interaction data through the streaming media server connected to the streaming coding and decoding interaction module.

10. The streaming-based VR multi-split system according to claim 1, wherein
the manipulation terminal and the control system are linked by wire or wirelessly, and the manipulation terminal and the control system are located in the same local area network or wireless public network.

11. A streaming-based VR multi-split method for presenting a picture using the streaming-based VR multi-split method as claimed in claim 10, the method comprising:
acquiring and coding a video picture from a VR platform through a streaming coding and decoding interaction module, and sending the coded video picture to a manipulation terminal;
receiving, decoding and displaying the coded video picture based on a streaming decoding and interaction processing module of the manipulation terminal, collecting interaction data at one side of the manipulation terminal in real time, and transmitting the interaction data to the streaming coding and decoding interaction module; and
acquiring and experiencing, by an experience terminal, a presentation picture corresponding to the interaction data through the streaming media server connected to the streaming coding and decoding interaction module.

12. The streaming-based VR multi-split system according to claim 1, wherein
the manipulation terminal and the experience terminal comprise a VR all-in-one machine, a PC or a Pad.

13. A streaming-based VR multi-split method for presenting a picture using the streaming-based VR multi-split method as claimed in claim 12, the method comprising:
acquiring and coding a video picture from a VR platform through a streaming coding and decoding interaction module, and sending the coded video picture to a manipulation terminal;
receiving, decoding and displaying the coded video picture based on a streaming decoding and interaction processing module of the manipulation terminal, collecting interaction data at one side of the manipulation terminal in real time, and transmitting the interaction data to the streaming coding and decoding interaction module; and
acquiring and experiencing, by an experience terminal, a presentation picture corresponding to the interaction data through the streaming media server connected to the streaming coding and decoding interaction module.

14. The streaming-based VR multi-split system according to claim 1, wherein
the VR platform comprises a SteamVR platform or a self-contained platform of the control system.

15. A streaming-based VR multi-split method for presenting a picture using the streaming-based VR multi-split method as claimed in claim 14, the method comprising:
acquiring and coding a video picture from a VR platform through a streaming coding and decoding interaction module, and sending the coded video picture to a manipulation terminal;
receiving, decoding and displaying the coded video picture based on a streaming decoding and interaction processing module of the manipulation terminal, collecting interaction data at one side of the manipulation terminal in real time, and transmitting the interaction data to the streaming coding and decoding interaction module; and
acquiring and experiencing, by an experience terminal, a presentation picture corresponding to the interaction data through the streaming media server connected to the streaming coding and decoding interaction module.

16. The streaming-based VR multi-split system according to claim 1, wherein
the experience terminal acquires a presentation picture corresponding to the operation of the experience terminal based on an address link corresponding to the video stream in the streaming media server.

17. A streaming-based VR multi-split method for presenting a picture using the streaming-based VR multi-split method as claimed in claim 16, the method comprising:
acquiring and coding a video picture from a VR platform through a streaming coding and decoding interaction module, and sending the coded video picture to a manipulation terminal;
receiving, decoding and displaying the coded video picture based on a streaming decoding and interaction processing module of the manipulation terminal, collecting interaction data at one side of the manipulation terminal in real time, and transmitting the interaction data to the streaming coding and decoding interaction module; and
acquiring and experiencing, by an experience terminal, a presentation picture corresponding to the interaction data through the streaming media server connected to the streaming coding and decoding interaction module.

18. A streaming-based VR multi-split method for presenting a picture using the streaming-based VR multi-split method as claimed in claim 1, the method comprising:
acquiring and coding a video picture from a VR platform through a streaming coding and decoding interaction module, and sending the coded video picture to a manipulation terminal;
receiving, decoding and displaying the coded video picture based on a streaming decoding and interaction processing module of the manipulation terminal, collecting interaction data at one side of the manipulation terminal in real time, and transmitting the interaction data to the streaming coding and decoding interaction module; and
acquiring and experiencing, by an experience terminal, a presentation picture corresponding to the interaction data through the streaming media server connected to the streaming coding and decoding interaction module.

19. A non-transitory computer-readable storage medium, a computer program is stored in the non-transitory computer-readable storage medium, wherein, when the computer program is executed by a processor, the computer program causes the processor to implement implements the steps of the method as claimed in claim 18.

20. An electronic device, comprising: a memory, a processor, and a computer program that is stored on the memory and executable on the processor, wherein the processor, when executing the computer program, implements the steps of the method as claimed in claim 18.

* * * * *